United States Patent
Saha et al.

(10) Patent No.: US 9,543,885 B2
(45) Date of Patent: Jan. 10, 2017

(54) ROTARY ELECTRIC MACHINE DRIVING DEVICE

(71) Applicant: AISIN AW CO., LTD., Anjo-shi, Aichi-ken (JP)

(72) Inventors: Subrata Saha, Anjo (JP); Arinori Shimada, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/761,802

(22) PCT Filed: Mar. 28, 2014

(86) PCT No.: PCT/JP2014/059145
§ 371 (c)(1),
(2) Date: Jul. 17, 2015

(87) PCT Pub. No.: WO2014/157629
PCT Pub. Date: Oct. 2, 2014

(65) Prior Publication Data
US 2015/0365040 A1    Dec. 17, 2015

(30) Foreign Application Priority Data

Mar. 29, 2013  (JP) ................................. 2013-073345

(51) Int. Cl.
| | |
|---|---|
| *H02P 6/00* | (2016.01) |
| *H02P 27/08* | (2006.01) |
| *H02P 27/06* | (2006.01) |
| *B60L 1/00* | (2006.01) |

(52) U.S. Cl.
CPC .............. *H02P 27/085* (2013.01); *B60L 1/00* (2013.01); *H02P 27/06* (2013.01)

(58) Field of Classification Search
CPC ............ H02P 27/085; H02P 27/06; B60L 1/00
USPC ..................................................... 318/400.25
See application file for complete search history.

(56) References Cited

U.S. PATENT DOCUMENTS

| | | | |
|---|---|---|---|
| 2005/0067996 A1* | 3/2005 | Eba ........................ | G05B 19/19 318/609 |
| 2005/0187752 A1* | 8/2005 | Colby ...................... | H03L 7/08 703/19 |
| 2010/0164416 A1 | 7/2010 | Yamada | |

(Continued)

FOREIGN PATENT DOCUMENTS

| | | |
|---|---|---|
| JP | 2009-106046 A | 5/2009 |
| JP | 2013-027149 A | 2/2013 |

(Continued)

*Primary Examiner* — Erick Glass
(74) *Attorney, Agent, or Firm* — Oliff PLC

(57) ABSTRACT

A rotary electric machine driving device that drives and controls an alternating-current rotary electric machine, the rotary electric machine driving device including: an inverter that is electrically interposed between a direct-current power supply and the rotary electric machine, and converts electric power between a direct current and an alternating current; a smoothing capacitor that is electrically interposed between the direct-current power supply and the inverter, and is connected between a positive pole and a negative pole on a direct-current side of the inverter; and an inverter control unit that controls switching of a switching element of the inverter according to a predefined switching frequency.

15 Claims, 8 Drawing Sheets

(56) References Cited

U.S. PATENT DOCUMENTS

2011/0194318 A1\* 8/2011 Kono ............... H02M 7/53875
                                                                            363/37
2013/0169206 A1     7/2013 Suhama et al.

FOREIGN PATENT DOCUMENTS

WO     2009/001738 A1    12/2008
WO     2011/155013 A1    12/2011

\* cited by examiner

ROTARY ELECTRIC MACHINE DRIVING DEVICE

BACKGROUND

The present disclosure relates to a rotary electric machine driving device that drives and controls an alternating-current rotary electric machine.

In recent years, from the viewpoint of, for example, energy saving and reduction of environmental loads, hybrid vehicles and electric vehicles each provided with a rotary electric machine as a source of driving force have been gaining attention. Such a vehicle includes a direct-current power supply, such as a battery, which supplies power when the rotary electric machine functions as the source of driving force (motor), and stores generated power when the rotary electric machine functions as a source of power (generator). When the rotary electric machine functions as the source of driving force (motor), direct-current power supplied from the direct-current power supply is converted into alternating-current power by an inverter to drive the rotary electric machine. When the rotary electric machine functions as the generator, alternating-current power generated by the rotary electric machine is converted into direct-current power by the inverter to be stored as regenerated power in the direct-current power supply.

A smoothing capacitor for smoothing the direct-current power is provided between the direct-current power supply and the inverter. In general, the inverter is constituted using switching elements, which are controlled to be switched at a predetermined switching frequency. As a result, a pulsation corresponding to the switching frequency is superposed on the direct-current power. The smoothing capacitor reduces fluctuations, such as the pulsation, of the direct-current power to keep voltages applied to the switching elements from exceeding the withstand voltage thereof, and keep the fluctuations in current from deteriorating the direct-current power supply.

In general, the direct-current side of the inverter for driving the rotary electric machine as the source of driving force of a hybrid electric vehicle or an electric vehicle is at a high voltage of 200 [V] to 400 [V]. Hence, the smoothing capacitor is required to have a high voltage resistance performance against such a high voltage, and at the same time, the fluctuation due to the pulsation needs to be considered. In addition, when withstand voltages of switching elements constituting the inverter are considered, the smoothing capacitor is required to have a sufficient capacitance for reducing the pulse component. These requirements generally increase the cost of the smoothing capacitor, and increase the physical size thereof, thus requiring a large installation space. Furthermore, the inverter and the smoothing capacitor are often installed in an integrated manner or mutually close to each other, as parts of a rotary electric machine driving device. In particular, an in-vehicle rotary electric machine driving device is required to be light in weight and small in size from the viewpoint of weight and installation space, so that the inverter and the smoothing capacitor are desired to be light in weight and small in size.

For example, Japanese Patent Application Publication No. 2009-106046 (JP 2009-106046 A) describes a space-saving rotary electric machine driving device (power converter) including a cooling mechanism. In this rotary electric machine driving device, a power module including switching elements is disposed on a flat surface inside of a case having a heat radiating portion. A smoothing capacitor electrically connected to the power module is disposed adjacent to the power module on a flat surface formed one step lower than the flat surface on which the power module is disposed (refer to paragraphs 7 and 8, FIG. 1, etc.). The smoothing capacitor required to have a high withstand voltage and large capacity tends to have a large physical size. In JP 2009-106046 A, the heat radiating portion and the power module are disposed in accordance with the height of the smoothing capacitor such that the overall height of the rotary electric machine driving device is reduced, thereby saving space.

In this manner, space saving can be achieved to some extent by making improvements in the layout of, for example, the circuit portion (power module), the cooling mechanism, and the smoothing capacitor of the inverter. However, reduction of weight and size of the entire device has not been accomplished by further reducing the physical size of the smoothing capacitor determined by the withstand voltage and the capacitance. Reducing the capacity of the smoothing capacitor allows the size to be reduced, but may reduce the effect of suppressing the deterioration of the direct-current power supply and the switching elements. Specifically, reducing the capacity of the smoothing capacitor to reduce the size thereof lowers the capability of smoothing the direct-current power, and thus increases the pulsations of a system voltage that is the voltage on the direct-current side of the inverter and a power supply current that is a current flowing through the direct-current power supply. This results in the possible reduction in the effect of suppressing the deterioration of the direct-current power supply and the switching elements.

SUMMARY

In view of the background described above, a technique is desired that can reduce the capacity of a smoothing capacitor on the direct-current side of an inverter while reducing the fluctuations, such as the pulsations, of the voltage and the current on the direct-current side of the inverter.

According to an exemplary embodiment of the present disclosure, a rotary electric machine driving device that drives and controls an alternating-current rotary electric machine has a characteristic feature including an inverter that is electrically interposed between a direct-current power supply and the rotary electric machine, and converts electric power between a direct current and an alternating current, including a smoothing capacitor that is electrically interposed between the direct-current power supply and the inverter, and is connected between a positive pole and a negative pole on a direct-current side of the inverter, and including an inverter control unit that controls switching of a switching element of the inverter according to a predefined switching frequency, in which the inverter control unit sets the switching frequency to a value varying corresponding to both torque and a rotating speed of the rotary electric machine, according to pulsation amplitude of a system voltage that is a voltage on the direct-current side of the inverter and pulsation amplitude of a power supply current that is a current flowing through the direct-current power supply.

Setting the switching frequency to be variable as in this characteristic feature allows the switching frequency to be appropriately set so as to reduce the pulsations of the system voltage and the power supply current to low levels according to the torque and the rotating speed of the rotary electric machine. Accordingly, the pulsation amplitudes of the system voltage and the power supply current are more easily limited within respective predetermined allowable ranges. As a result, the capacity of the smoothing capacitor can be reduced while reducing the fluctuations of the voltage and the current on the direct-current side of the inverter.

To reduce the fluctuations of the voltage and the current on the direct-current side of the inverter, the pulsation amplitudes of the system voltage and the power supply current are desirably limited within allowable ranges predefined as allowable ranges for the respective pulsation amplitudes according to the torque and the rotating speed of the rotary electric machine. Accordingly, as an aspect of the present disclosure, the inverter control unit preferably sets the switching frequency to a value varying corresponding to both the torque and the rotating speed of the rotary electric machine so that each of the pulsation amplitude of the system voltage that is the voltage on the direct-current side of the inverter and the pulsation amplitude of the power supply current that is the current flowing through the direct-current power supply falls within a predefined allowable range.

A rotary electric machine driving device according to an exemplary embodiment of the present disclosure that drives and controls an alternating-current rotary electric machine has another characteristic feature including an inverter that is electrically interposed between a direct-current power supply and the rotary electric machine, and converts electric power between a direct current and an alternating current, including a smoothing capacitor that is electrically interposed between the direct-current power supply and the inverter, and is connected between a positive pole and a negative pole on a direct-current side of the inverter, and including an inverter control unit that controls switching of a switching element of the inverter according to a predefined switching frequency, in which the inverter control unit sets the switching frequency to a value varying corresponding to both torque and a rotating speed of the rotary electric machine, according to pulsation amplitude of a system voltage that is a voltage on the direct-current side of the inverter.

Setting the switching frequency to be variable as in this characteristic feature allows the switching frequency to be appropriately set so as to reduce the pulsation of the system voltage to a low level according to the torque and the rotating speed of the rotary electric machine. Accordingly, the pulsation amplitude of the system voltage is more easily limited within a predetermined allowable range. As a result, the capacity of the smoothing capacitor can be reduced while reducing the fluctuation of the voltage on the direct-current side of the inverter.

To reduce the fluctuation of the voltage on the direct-current side of the inverter, the pulsation amplitude of the system voltage is desirably limited within an allowable range predefined as an allowable range for the pulsation amplitude according to the torque and the rotating speed of the rotary electric machine. Accordingly, as an aspect of the present disclosure, the inverter control unit preferably sets the switching frequency to a value varying corresponding to both the torque and the rotating speed of the rotary electric machine so that the pulsation amplitude of the system voltage that is the voltage on the direct-current side of the inverter falls within the predefined allowable range.

A rotary electric machine driving device according to an exemplary embodiment of the present disclosure that drives and controls an alternating-current rotary electric machine has another characteristic feature including an inverter that is electrically interposed between a direct-current power supply and the rotary electric machine, and converts electric power between a direct current and an alternating current, including a smoothing capacitor that is electrically interposed between the direct-current power supply and the inverter, and is connected between a positive pole and a negative pole on a direct-current side of the inverter, and including an inverter control unit that controls switching of a switching element of the inverter according to a predefined switching frequency, in which the inverter control unit sets the switching frequency to a value varying corresponding to both torque and a rotating speed of the rotary electric machine, according to a pulsation amplitude of a power supply current that is a current flowing through the direct-current power supply.

Setting the switching frequency to be variable as defined as in this characteristic feature allows the switching frequency to be appropriately set so as to reduce the pulsation of the power supply current to a low level according to the torque and the rotating speed of the rotary electric machine. Accordingly, the pulsation amplitude of the power supply current is more easily limited within a predetermined allowable range. As a result, the capacity of the smoothing capacitor can be reduced while reducing the fluctuation of the current on the direct-current side of the inverter.

To reduce the fluctuation of the current on the direct-current side of the inverter, the pulsation amplitude of the power supply current is desirably limited within an allowable range predefined as an allowable range for the pulsation amplitude according to the torque and the rotating speed of the rotary electric machine. Accordingly, as an aspect of the present disclosure, the inverter control unit preferably sets the switching frequency to a value varying corresponding to both the torque and the rotating speed of the rotary electric machine so that the pulsation amplitude of the power supply current that is the current flowing through the direct-current power supply falls within a predefined allowable range.

In general, the pulsation amplitudes of the system voltage and the battery current increase as the torque and the rotating speed of the rotary electric machine increase. The relatively increasing pulsation amplitudes can be compensated by reducing a switching period (in other words, by increasing the switching frequency). As an aspect of the present disclosure, the inverter control unit preferably sets the switching frequency higher as rotary electric machine power or a modulation factor increases, the rotary electric machine power being calculated by multiplying the torque by the rotating speed of the rotary electric machine, the modulation factor representing a ratio of an effective value of an alternating-current voltage command value to the system voltage.

In general, the direct-current power supply includes a resistance component (R component) and an induction component (L component). Hence, an RLC circuit is formed in conjunction with the capacity component (C component) of the smoothing capacitor, and a direct-current side voltage gain obtained by dividing the system voltage by a system current (current on the direct-current side of the inverter) exhibits a frequency characteristic that has a resonance point. The value of the direct-current side voltage gain increases as the frequency increases from zero, reaches the maximum value (resonance point) at a resonance frequency, and decreases as the frequency increases from the resonance point serving as an inflection point. A frequency component twice the switching frequency is known to be one of influential frequencies among frequencies of pulsation components occurring in the system voltage. When the resonance frequency described above is close to the frequency twice the switching frequency, the value of the direct-current side voltage gain is large, so that the amplitude of the pulsation is large. Hence, the frequency twice the switching frequency is preferably away from the resonance frequency. Noise in an audible range is also known as a phenomenon caused by the switching frequency. Hence, the noise needs to be reduced in addition to the reduction of the pulsations.

In view of the above, if the switching frequency is set, for example, so as to be higher than a frequency at which the value of the direct-current side voltage gain is maximum, the frequency twice the switching frequency results in a still higher frequency, and thus is away from the resonance frequency. When the switching frequency thus calculated is included in the audible range, the noise in the audible range can be reduced by setting the switching frequency to a frequency equal to or higher than a predefined limit frequency. As a result, the noise in the audible range can be reduced while reducing the fluctuations of the voltage and the current on the direct-current side of the inverter, which is preferable. As an aspect of the present disclosure, the inverter control unit preferably sets the switching frequency so as to be equal to or higher than a limit frequency having a predefined value above an audible range, and so as to be higher than a frequency at which the value of the direct-current side voltage gain is maximum in the frequency characteristic of the direct-current side voltage gain obtained by dividing the system voltage by a system current that is a current on the direct-current side of the inverter.

Moreover, if the switching frequency is set, for example, so as to be higher than a frequency at which the value of the direct-current side voltage gain is equal to a value thereof at a frequency of zero, the frequency twice the switching frequency results in a still higher frequency, and thus is further away from the resonance frequency. As a result, the fluctuations of the voltage and the current on the direct-current side of the inverter can be more reliably reduced, which is preferable. As an aspect of the present disclosure, with the noise reduction also taken into account, the inverter control unit preferably sets the switching frequency so as to be equal to or higher than the limit frequency having a predefined value above the audible range, and so as to be equal to or higher than the frequency at which, in the frequency characteristic of the direct-current side voltage gain, the value of the direct-current side voltage gain is equal to a value thereof at the frequency of zero.

In consideration of the current situation of control, it is practical to variably set the switching frequency in a stepwise manner. In general, the operation of the rotary electric machine is controlled according to an operation region defined by the power calculated by multiplying the torque by the rotating speed. Accordingly, it is convenient if the operation region of the rotary electric machine is linked to the stepwise setting of the switching frequency. As an aspect of the present disclosure, a plurality of operation regions are preferably set corresponding to power calculated by multiplying the torque by the rotating speed of the rotary electric machine, and the inverter control unit preferably sets the switching frequency to a value that is different for each of the operation regions.

DETAILED DESCRIPTION OF THE EMBODIMENTS

Figure 1:
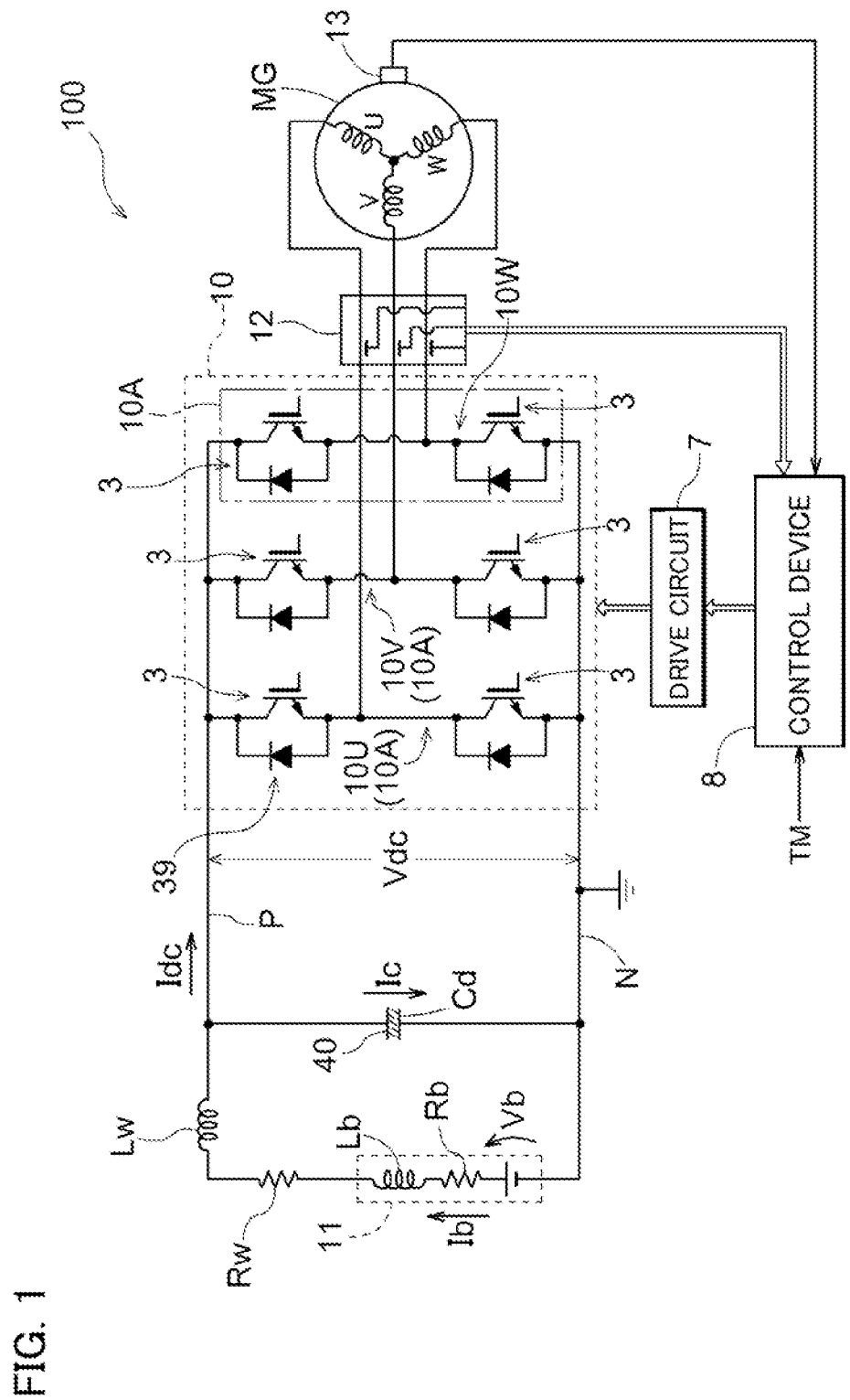
FIG. 1 is a block diagram schematically showing an example of a system structure of a rotary electric machine driving device.

Based on the drawings, an embodiment of the present disclosure is described by way of an example of a rotary electric machine driving device that controls a rotary electric machine MG serving as a source of driving force of a hybrid vehicle, an electric vehicle, or the like. A block diagram of FIG. 1 schematically shows a system structure of a rotary electric machine driving device 100. The rotary electric machine MG as the source of driving force of the vehicle is a rotary electric machine that operates with an alternating-current having a plurality of phases (here, three-phase alternating current), and can function as both an electric motor and an electric generator.

A vehicle, such as an automobile, which cannot be supplied with electric power from an overhead wire as in the case of a railway is equipped with, as a source of power for driving the rotary electric machine, a direct-current power supply, including, secondary cells (battery), such as nickel-hydrogen cells or lithium-ion cells, or electric double-layer capacitors. In the present embodiment, a battery 11 (high-voltage direct-current power supply) having a power supply voltage of, for example, 200 [V] to 400 [V] is provided as the high-voltage, large-capacity direct-current power supply for supplying the power to the rotary electric machine MG. Direct current flowing through the battery 11 is called a "battery current (power supply current)" where appropriate in the following description. The rotary electric machine MG is an alternating-current rotary electric machine, so that an inverter 10 for performing power conversion between the direct current and the alternating current is provided between the battery 11 and the rotary electric machine MG. A direct-current voltage between a positive power supply line P (high-voltage direct-current positive line) and a negative power supply line N (high-voltage direct-current negative line) on the direct-current side of the inverter 10 is called a "system voltage Vdc" where appropriate in the following description. The battery 11 can supply power to the rotary electric machine MG through the inverter 10, and can store power generated by the rotary electric machine MG and obtained therefrom. A smoothing capacitor 40 (direct-current link capacitor) for smoothing the direct-current voltage (system voltage Vdc) is provided between the inverter 10 and the battery 11. The smoothing capacitor 40 stabilizes the direct-current voltage that fluctuates in response to fluctuation in power consumption of the rotary electric machine MG.

The battery 11 is constituted by a plurality of battery cells, and has an internal impedance including an internal resistance (resistance component) and an internal inductance (induction component). In the present embodiment, these are called a battery resistance Rb and a battery inductance Lb. The battery 11 is connected to the inverter 10 using, for example, metal wiring members called busbars. Such busbars also have a conductor impedance including a conductor resistance (resistance component) and a conductor inductance (induction component). That is, wiring connecting the battery 11, the smoothing capacitor 40, and the inverter 10 has a wiring impedance including a wiring resistance and a wiring inductance. In the present embodiment, these are called a wiring resistance Rw and a wiring inductance Lw.

Figure 2:
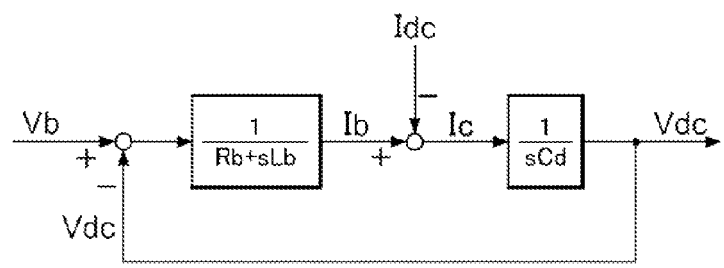
FIG. 2 is a block diagram showing a control model of a direct-current power supply unit.

Regarding the battery 11 side of the inverter 10, the internal resistance of the direct-current power supply unit including the wiring members such as the busbars (power supply internal resistance Rps) is the sum of the battery resistance Rb and the wiring resistance Rw. Also, the internal inductance of the direct-current power supply unit (power supply internal inductance Lps) is the sum of the battery inductance Lb and the wiring inductance Lw. In many cases, however, the battery resistance Rb is much larger than the wiring resistance Rw, and the battery inductance Lb is much larger than the wiring inductance Lw. Hence, in the following description, the battery resistance Rb is used as the power supply internal resistance Rps, and the battery inductance Lb is used as the power supply internal inductance Lps. A block diagram of FIG. 2 shows a control model representing, as the direct-current power supply unit, a relation between the voltage between terminals (battery voltage Vb) of the battery 11 and the system voltage Vdc.

The inverter 10 converts the direct-current power having the system voltage Vdc into the alternating-current power having a plurality of phases (n phases, where n is a natural number; here, three phases), and supplies the alternating-current power to the rotary electric machine MG, The inverter 10 also converts the alternating-current power generated by the rotary electric machine MG into the direct-current power, and supplies the direct-current power to the direct-current power supply. The inverter 10 includes a plurality of switching elements. A power semiconductor device, such as an insulated-gate bipolar transistor (IGBT) or a power metal-oxide-semiconductor field-effect transistor (MOSFET) is preferably employed as the switching element. Instead of such a silicon (Si) device, a silicon carbide (SiC) device, such as an SiC-MOSFET or an SiC static induction transistor (SiC-SIT), or a complex compound power device, such as a gallium nitride MOSFET (GaN-MOSFET), which can operate at high frequencies may preferably be employed as the switching element. In the present embodiment, as an example, an IGBT 3 is used as the switching element, as shown in FIG. 1.

The inverter 10 for performing the power conversion between the direct current and the alternating-current having a plurality of phases (here, three-phase alternating current) is formed by a bridge circuit that includes the number of arms corresponding to the number of the phases (here, three phases), as is well known. Specifically, as shown in FIG. 1, two of the IGBTs 3 are connected in series between the direct-current positive side (the positive power supply line P on the positive side of the direct-current power supply) of the inverter 10 and the direct-current negative side (the negative power supply line N on the negative side of the direct-current power supply) of the inverter 10 to form one arm 10A. The IGBT 3 connected to the positive power supply line P is called an upper-stage IGBT (an upper-stage switching element or a high-side switch), and the IGBT 3 connected to the negative power supply line N is called a lower-stage IGBT (negative-side switching element or low-side switch).

When the alternating current having a plurality of phases is the three-phase alternating current, three lines (for three phases 10U, 10V, and 10W) of such series circuits (10A for one arm) are connected in parallel with each other. Specifically, the bridge circuit is formed in which one set of series circuit (arm 10A) corresponds to a stator coil corresponding to each of the U-phase, the V-phase, and the W-phase of the rotary electric machine MG. In the upper-stage IGBT in each phase, the collector terminal is connected to the positive power supply line P, and the emitter terminal is connected to the collector terminal of the lower-stage IGBT the same phase. The emitter terminal of the lower-stage IGBT in each phases is connected to the negative power supply line N. A midpoint of the series circuit (arm 10A) formed by a pair of IGBTs 3 in each of the phases, that is, a connection point between the upper-stage IGBT and the lower-stage IGBT in each of the phases is connected to the corresponding stator coil of the rotary electric machine MG. A free-wheel diode 39 (regenerative diode) is connected in parallel to each of the IGBTs 3. The free-wheel diode 39 is connected in parallel to each of the IGBTs 3 in a manner such that the cathode terminal of the free-wheel diode 39 is connected to the collector terminal of the IGBT 3, and the anode terminal of the free-wheel diode 39 is connected to the emitter terminal of the IGBT 3.

As shown in FIG. 1, the inverter 10 is controlled by a control device 8. The control device 8 includes an electronic control unit (ECU) that is built using a logical circuit, such as a microcomputer, as a core member. In the present embodiment, the ECU controls the rotary electric machine MG via the inverter 10 by executing current feedback control using a vector control method based on target torque TM of the rotary electric machine MG provided to the control device 8 as a request signal from, for example, another control device such as a vehicle ECU (not shown). As is well-known, the vector control method is a method of performing calculation by applying coordinate transformation to currents flowing through respective stator coils of a plurality of phases (three phases, in the present example) to convert the currents into two vector components along the d-axis in the direction of a magnetic pole of a rotor and the q-axis that is orthogonal to the d-axis. The ECU of the control device 8 includes various functional units for the current feedback control, and the functional units are implemented through cooperation of hardware, such as the microcomputer, and software (a program). In the present embodiment, the control device 8 corresponds to an inverter control unit in the present disclosure.

An actual current flowing through the stator coil in each phase of the rotary electric machine MG is detected by a current sensor 12, and the control device 8 acquires the result of the detection. A rotation sensor 13 detects a magnetic pole position of a rotor of the rotary electric machine MG at each time, and the control device 8 acquires the result of the detection. The rotation sensor 13 is constituted by, for example, a resolver. The magnetic pole position represents a rotation angle of the rotor in terms of an electrical angle. The ECU of the control device 8 performs feedback control of the rotary electric machine MG based on the results of the detection by the current sensor 12 and the rotation sensor 13.

Figure 9:
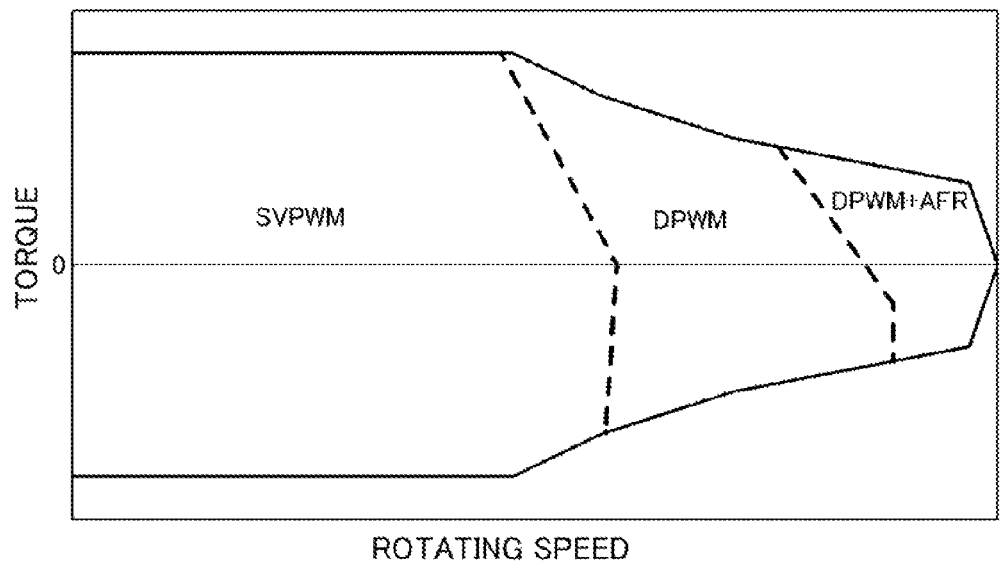
FIG. 9 is a diagram showing a correspondence map of modulation modes corresponding to torque and a rotating speed of a rotary electric machine.

The ECU of the control device 8 controls the rotary electric machine MG according to a certain modulation mode selected from a plurality of modulation modes. In the present embodiment, the modulation modes include a three-phase modulation mode (SVPWM) and a two-phase modulation mode (DPWM), as shown in FIG. 9. The three-phase modulation mode is a mode of controlling the rotary electric machine MG by outputting PWM pulse signals for three phases based on a comparison between a carrier wave and a signal wave according to an alternating-current voltage command value of each of the phases. The two-phase modulation mode is a mode of controlling the rotary electric machine MG by outputting PWM pulse signals for two phases (sequentially switched) and outputting an on-off signal for the remaining one phase (sequentially switched). During the two-phase modulation mode, field-weakening control may be executed in parallel (DPWM+AFR) in some cases. The field-weakening control is control of reducing a d-axis current and a q-axis current so as to output the target torque even when a back electromotive force increases with increase in the rotating speed of the rotary electric machine MG. Each of these modes is alternatively selected according to the torque and the rotating speed of the rotary electric machine MG, based on a predefined map.

The vehicle is equipped with a low-voltage battery (low-voltage direct-current power supply) serving as a lower-voltage power supply than the battery 11, in addition to the battery 11 as the high-voltage direct-current power supply (not shown). The low-voltage battery has a power supply voltage of, for example, 12 V to 24 V, and supplies power to the control device 8 (ECU), electric components, such as an audio system, lighting equipment, interior lighting equipment, instrument illumination devices, and power windows, and control devices for controlling these electric components. The control device 8 includes, for example, a regulator circuit, and generates a power source suitable for operating the microcomputer and the like based on the power supplied from the low-voltage battery.

The gate terminal serving as the control terminal of each of the IGBTs 3 constituting the inverter 10 is connected to the control device 8 (ECU) through a drive circuit 7, and is individually controlled to be switched. The high-voltage circuits for driving the rotary electric machine MG greatly differ in operating voltage (power supply voltage of the circuits) from the low-voltage circuits, such as the ECU having the microcomputer and the like as a core. For this reason, a control signal (switching control signal) for each of the IGBTs 3 generated by the control device 8 (ECU) serving as a low-voltage circuit is supplied to the corresponding IGBT 3 through the drive circuit 7, as a gate driving signal of a high-voltage circuit. The drive circuit 7 often includes an insulating element such as a photocoupler or a transformer.

As described above, the control device 8 is constituted by the logical circuit, such as the microcomputer, serving as a core. In the present embodiment, the control device 8 is constituted by the microcomputer serving as a core which executes a rotary electric machine driving program. The microcomputer includes a CPU core, a program memory, a parameter memory, a work memory, a timer, and ports. The CPU core is a core of the microcomputer, and includes an instruction register, an instruction decoder, an arithmetic logic unit (ALU) serving as the main execution body of various operations, flag registers, general-purpose registers, and an interrupt controller. In the present embodiment, while a configuration is illustrated in which the microcomputer is constituted by one semiconductor chip, a configuration can be obviously adopted in which a microcomputer unit is constituted by a combination of a plurality of components.

The program memory is a nonvolatile memory storing the rotary electric machine driving program. The parameter memory is a nonvolatile memory storing various parameters that are referred to when the program is executed. The parameter memory may be formed without being distinguished from the program memory. The program memory and the parameter memory are preferably formed of, for example, a flash memory. The work memory is a memory for temporarily storing temporary data while the program is running. The work memory may be volatile, and is formed of a dynamic RAM (DRAM) or a static RAM (SRAM) that allows quick data reading and writing.

The timer measures time using the clock cycle of the microcomputer as the minimum resolution. The timer monitors, for example, the execution period of the program. The timer also measures the effective time of the switching control signal for driving the IGBT 3 of the inverter 10, and generates the switching control signal. The timer also manages control periods predefined by the program or parameters, such as the period (basic control period) of executing one loop of the current feedback control and the output period (switching period Tc) of the switching control signal. The ports serve as a terminal control unit that outputs, for example, the switching control signal for the IGBT 3 of the inverter 10 through a terminal of the microcomputer, and receives the rotation detection signal which is supplied from the rotation sensor 13 and is input to the microcomputer and the current detection signal from the current sensor 12.

Figure 3:
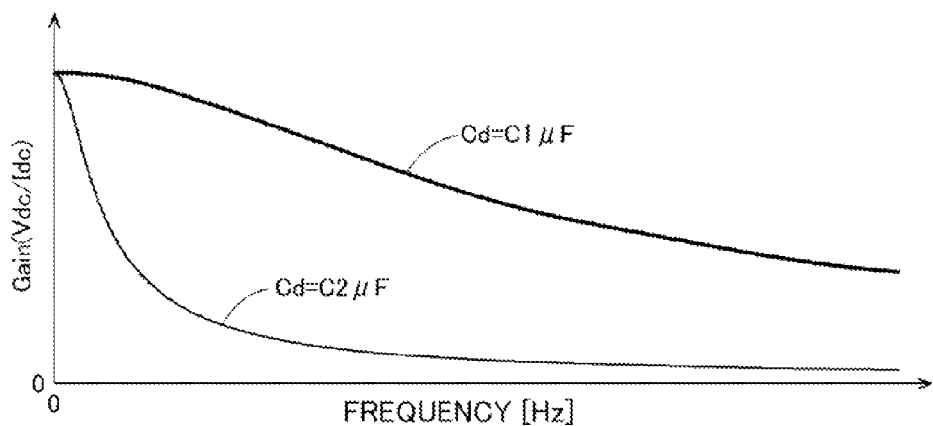
FIG. 3 shows a frequency characteristic of a gain when only a resistance component is taken into account.
Figure 4:
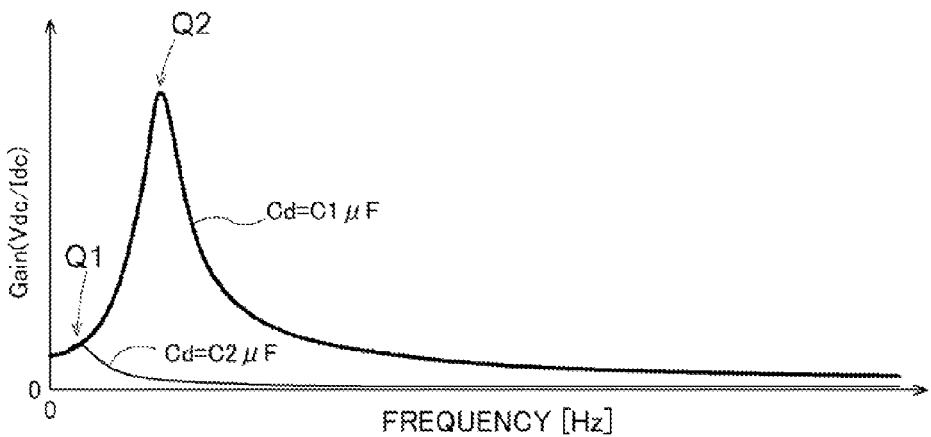
FIG. 4 shows the frequency characteristic of the gain when the resistance component and an induction component are taken into account.

As shown in FIG. 2, the transfer function for the control model of the battery 11 serving as the direct-current power supply unit includes the battery inductance Lb and the capacitance (direct-current link capacitance Cd) of the smoothing capacitor 40 as impedance components which are dependent on the frequency. As a result, the system voltage Vdc is a function of frequency. Each of FIGS. 3 and 4 shows a frequency characteristic of a gain (direct-current side voltage gain) defined by the system voltage Vdc and a system current Idc flowing through the inverter 10. When the battery inductance Lb is not taken into account, the gain (direct-current side voltage gain) of the system voltage Vdc relative to the system current Idc is defined by formula (1), and exhibits the frequency characteristic shown in FIG. 3. When the battery inductance Lb is taken into account, the direct-current side voltage gain is defined by formula (2), and exhibits the frequency characteristic shown in FIG. 4.

[Formula 1]

$$\text{Gain}(DC\text{ link voltage}) = \frac{Vdc}{Idc} = \frac{Rb}{\sqrt{1 + \omega^2 \cdot Cd^2 \cdot Rb^2}} \quad (1)$$

[Formula 2]

$$\text{Gain}(DC\text{ link voltage}) = \frac{Vdc}{Idc} = \frac{\sqrt{Rb^2 + (\omega \cdot Lb)^2}}{\sqrt{(1 - \omega^2 \cdot Cd \cdot Lb)^2 + (\omega \cdot Rb \cdot Cd)^2}} \quad (2)$$

As understood from formulae (1) and (2) and FIGS. 3 and 4, the direct-current side voltage gain is smaller as the capacitance (direct-current link capacitance Cd) of the smoothing capacitor 40 is larger. In other words, reducing the capacity of the smoothing capacitor 40 to reduce the size of the smoothing capacitor 40 increases the direct-current side voltage gain, and thus reduces an effect of suppressing pulsation of the system voltage Vdc. In addition, as is clear from the comparison between FIGS. 3 and 4, when the battery inductance Lb is taken into account as the impedance of the direct-current power supply unit, resonance occurs between the battery inductance Lb and the direct-current link capacitance Cd. This resonance also needs to be taken into account. In other words, when the battery inductance Lb is not taken into account as the impedance of the direct-current power supply unit, merely reducing the capacity of the smoothing capacitor 40 simply results in a higher direct-current side voltage gain. In contrast, when the battery inductance Lb is taken into account, the resonance greatly increases the direct-current side voltage gain at a certain frequency. As illustrated in FIG. 4, the value of the gain at a resonance point (Q2) when the direct-current link capacitance Cd is C1 [µF] is much larger than the value of the gain at a resonance point (Q1) when the direct-current link capacitance Cd is C2 [µF], which is 10 times C1 (=10·C1).

Figure 5:
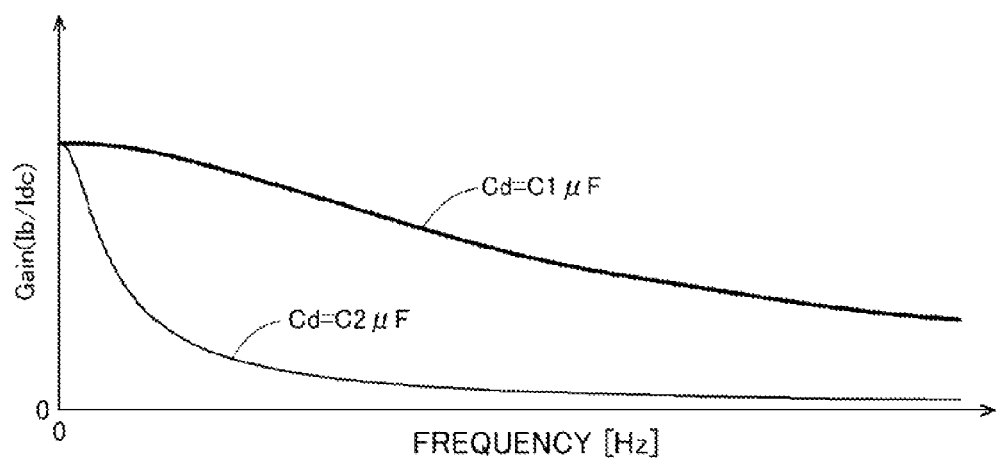
FIG. 5 shows a frequency characteristic of a gain when only the resistance component is taken into account.
Figure 6:
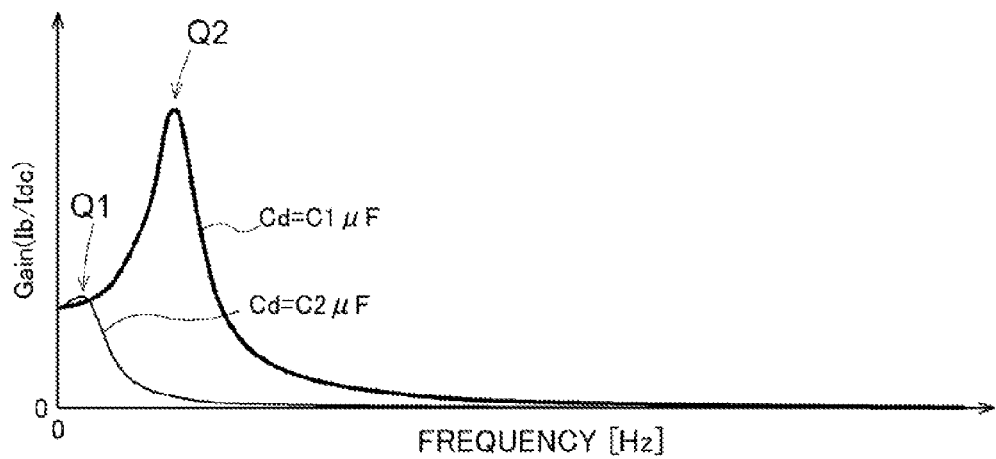
FIG. 6 shows the frequency characteristic of the gain when the resistance component and the induction component are taken into account.

The gain of a battery current Ib relative to the system current Idc (battery current gain) (it can be referred to as a direct current gain) is also a function of frequency. Each of FIGS. 5 and 6 shows a frequency characteristic of the gain (battery current gain) defined by the battery current Ib and the system current Idc flowing through the inverter 10. When the battery inductance Lb is not taken into account, the battery current gain is defined by formula (3), and exhibits the frequency characteristic shown in FIG. 5. When the battery inductance Lb is taken into account, the battery current gain is defined by the following Expression (4), and exhibits the frequency characteristic shown in FIG. 6.

[Formula 3]

$$\text{Gain}(\text{battery current}) = \frac{Ib}{Idc} = \frac{1}{\sqrt{1 + \omega^2 \cdot Cd^2 \cdot Rb^2}} \quad (3)$$

[Formula 4]

$$\text{Gain}(\text{battery current}) = \frac{Ib}{Idc} = \frac{1}{\sqrt{(1 - \omega^2 \cdot Cd \cdot Lb)^2 + (\omega \cdot Rb \cdot Cd)^2}} \quad (4)$$

As understood from formulae (3) and (4) and FIGS. 5 and 6, the battery current gain is smaller as the capacitance (direct-current link capacitance Cd) of the smoothing capacitor 40 is larger. In other words, reducing the capacity of the smoothing capacitor 40 to reduce the size of the smoothing capacitor 40 increases the gain, and thus reduces an effect of suppressing pulsation generated in the battery current Ib. In addition, as is clear from the comparison between FIGS. 5 and 6, when the battery inductance Lb is taken into account as the impedance of the direct-current power supply unit, resonance occurs between the battery inductance Lb and the direct-current link capacitance Cd. This resonance also needs to be taken into account. In other words, when the battery inductance Lb is not taken into account as the impedance of the direct-current power supply unit, merely reducing the capacity of the smoothing capacitor 40 simply results in a higher battery current gain. In contrast, when the battery inductance Lb is taken into account, the resonance greatly increases the battery current gain at a certain frequency. As illustrated in FIG. 6, the value of the gain at the resonance point (Q2) when the direct-current link capacitance Cd is C1 [µF] is much larger than the value of the gain at the resonance point (Q1) when the direct-current link capacitance Cd is C2 [µF], which is 10 times C1.

Of the resistance component (R component) and the induction component (L component) of the battery 11 and the capacity component (C component) of the smoothing capacitor, the impedance components dependent on the frequency are the L component and the C component. Hence, the value of each of the direct-current side voltage gain and the battery current gain increases as the frequency increases from zero, reaches the maximum value (resonance point) at the resonance frequency, and decreases as the frequency increases from the resonance point serving as an inflection point. For example, in an analysis at a switching frequency of 100 Hz or higher, the resonance frequency may be calculated based on only the resistance component (R component) and the induction component (L component) of the battery 11.

The pulsations of the system voltage Vdc and the battery current Ib occur in association with fluctuation in current and voltage associated with the switching of the IGBT 3 of the inverter 10. In other words, the pulsations of the system voltage Vdc and the battery current Ib occur corresponding to a switching frequency fc (reciprocal of the switching period Tc) of the IGBT 3. For example, it is known that pulsations having a frequency component of "2fc" (ripple frequency) twice the switching frequency fc occurs. If the frequency ("frp" to be described later) of the resonance between the direct-current link capacitance Cd and the battery inductance Lb is close to the ripple frequency "2fc", the value of the direct-current side voltage gain is large, so that the pulsation is large. The resonance frequency frp is determined by the hardware structure of the rotary electric machine driving device 100, including the battery 11. Accordingly, it is preferable that the switching frequency fc is appropriately set so as to move the ripple frequency "2fc" away from the resonance frequency frp within a range in which the control device 8 can perform control. The following describes a method for setting the switching frequency fc in that manner.

Figure 7:
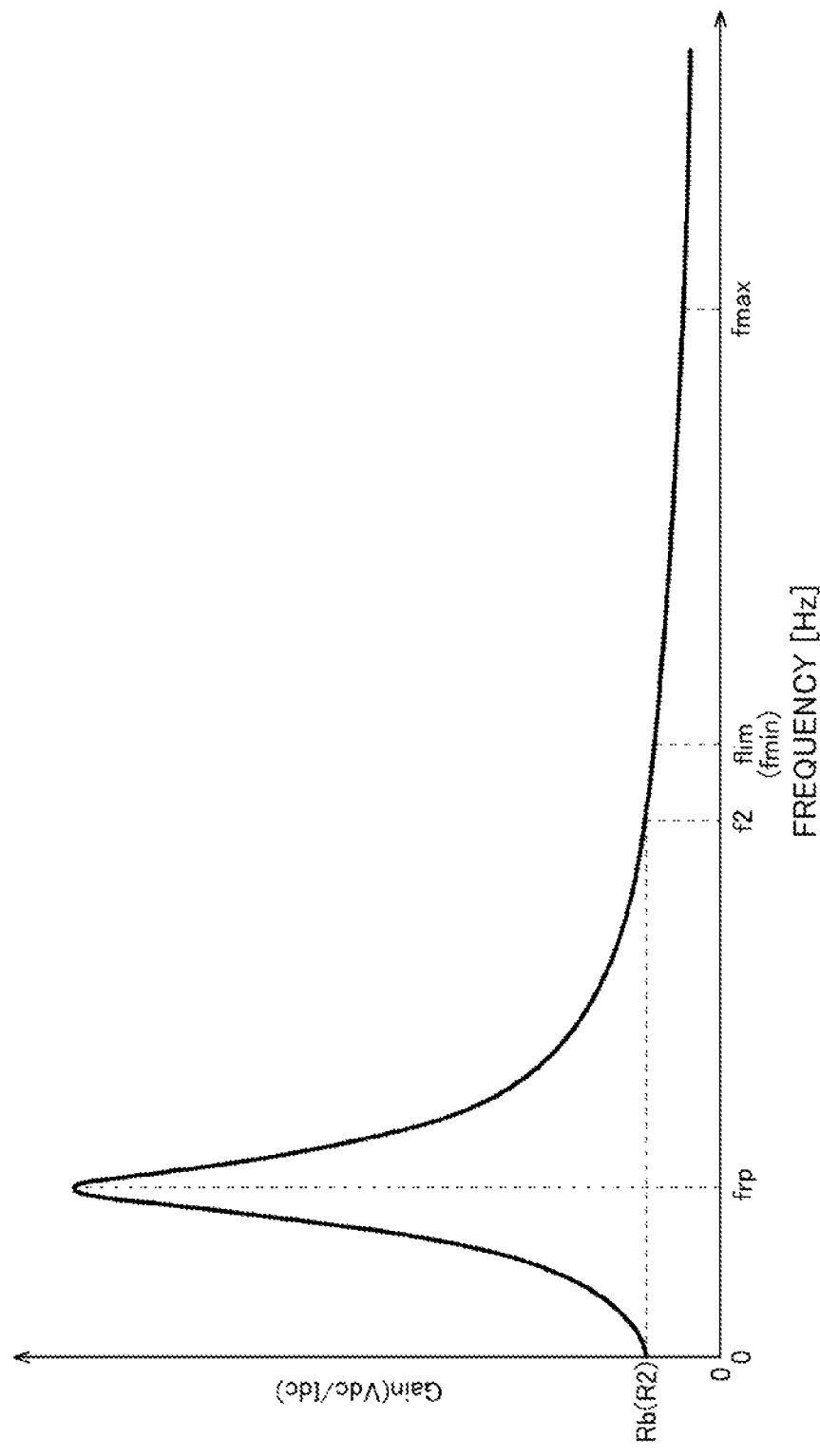
FIG. 7 is a diagram showing a condition for determining a switching frequency in the frequency characteristic.

FIG. 7 shows a simulation result of the direct-current side voltage gain when the direct-current link capacitance Cd is C1 [µF], the battery inductance Lb is L1 [µH], and the battery resistance Rb at room temperature is R2Ω. As shown in FIG. 7, a resonance peak appears at the resonance frequency frp. The resonance frequency frp is obtained by formula (5).

[Formula 5]

$$frp = \frac{1}{2\pi}\sqrt{\frac{1}{Cd \cdot Lb}} \qquad (5)$$

As described above, the pulsation of the system voltage Vdc occurs at the ripple frequency "2fc", which is twice the switching frequency fc of the inverter 10. As the ripple frequency "2fc" is closer to the resonance frequency frp, the pulsation of the system voltage Vdc is larger, and the pulsation of the battery current Ib is also larger. The pulsation of the battery current Ib reduces the durability (lifetime) of the battery 11. In the example shown in FIG. 7, if the switching frequency fc of the switching control signal is 5 [kHz], the ripple frequency "2fc" is 10 [kHz] and the resonance frequency frp is about 13 [kHz], so that the ripple frequency 2fc is equal or close to the resonance frequency frp, and thus, the pulsation increases. For this reason, the switching frequency fc serving as the cause of the ripple frequency 2fc is preferably moved away from the resonance frequency frp.

In the frequency characteristic shown in FIG. 7, when the switching frequency fc is moved away from the resonance frequency frp, the switching frequency fc can be moved toward either the lower side or the higher side. However, moving the switching frequency fc toward the lower side reduces the resolution of the switching control of the inverter 10, and may thus reduce the smoothness of rotation control of the rotary electric machine MG. Hence, the switching frequency fc is preferably adjusted toward a higher frequency. As an embodiment, the switching frequency fc is preferably set to a frequency higher than a frequency at which the value of the direct-current side voltage gain is maximum. As is clear from FIG. 7, the value of the direct-current side voltage gain is maximum at the resonance frequency frp. When the switching frequency fc is set to a frequency higher than the resonance frequency frp, the frequency twice the switching frequency fc is adjusted toward a higher frequency relative to the resonance frequency frp. Specifically, the lower limit frequency fmin of the switching frequency fc results in the resonance frequency frp, in this case.

As an embodiment, the lower limit frequency fmin of the switching frequency fc may preferably be set to a frequency (f2) at which the value of the direct-current side voltage gain is equal to the gain at a frequency of "0". As is clear from FIG. 7 and the like, the value of the direct-current side voltage gain increases as the frequency increases from zero, reaches the maximum value (resonance point) at the resonance frequency frp, and decreases as the frequency increases from the resonance point serving as an inflection point. Therefore, the high frequency that is equal to or higher than the frequency at which the value of the direct-current side voltage gain reaches the value thereof at the frequency of zero is a frequency higher than the resonance frequency frp. The frequency (2fc) twice the switching frequency fc is a still higher frequency, and is therefore still away from the resonance frequency frp. As a result, the pulsations of the system voltage Vdc and the battery current Ib can effectively be kept from increasing. In particular, when the resonance frequency frp is lower, the distance between the resonance frequency frp and the frequency (2fc) twice the switching frequency fc can be more increased than in the case in which the switching frequency fc is set close to the resonance frequency frp. As is clear from formula (2) given above, the value of the gain at the frequency of "0" is the "battery resistance Rb (power supply internal resistance Rps)". In this case, the lower limit frequency fmin is represented by formula (6).

[Formula 6]

$$f\min = \frac{1}{2\pi}\sqrt{\frac{Lb^2 + 2 \cdot Cd \cdot Lb - Rb^2 \cdot Cd^2}{Rb^2 \cdot Cd^2 \cdot Lb^2}} \qquad (6)$$

Figure 8:
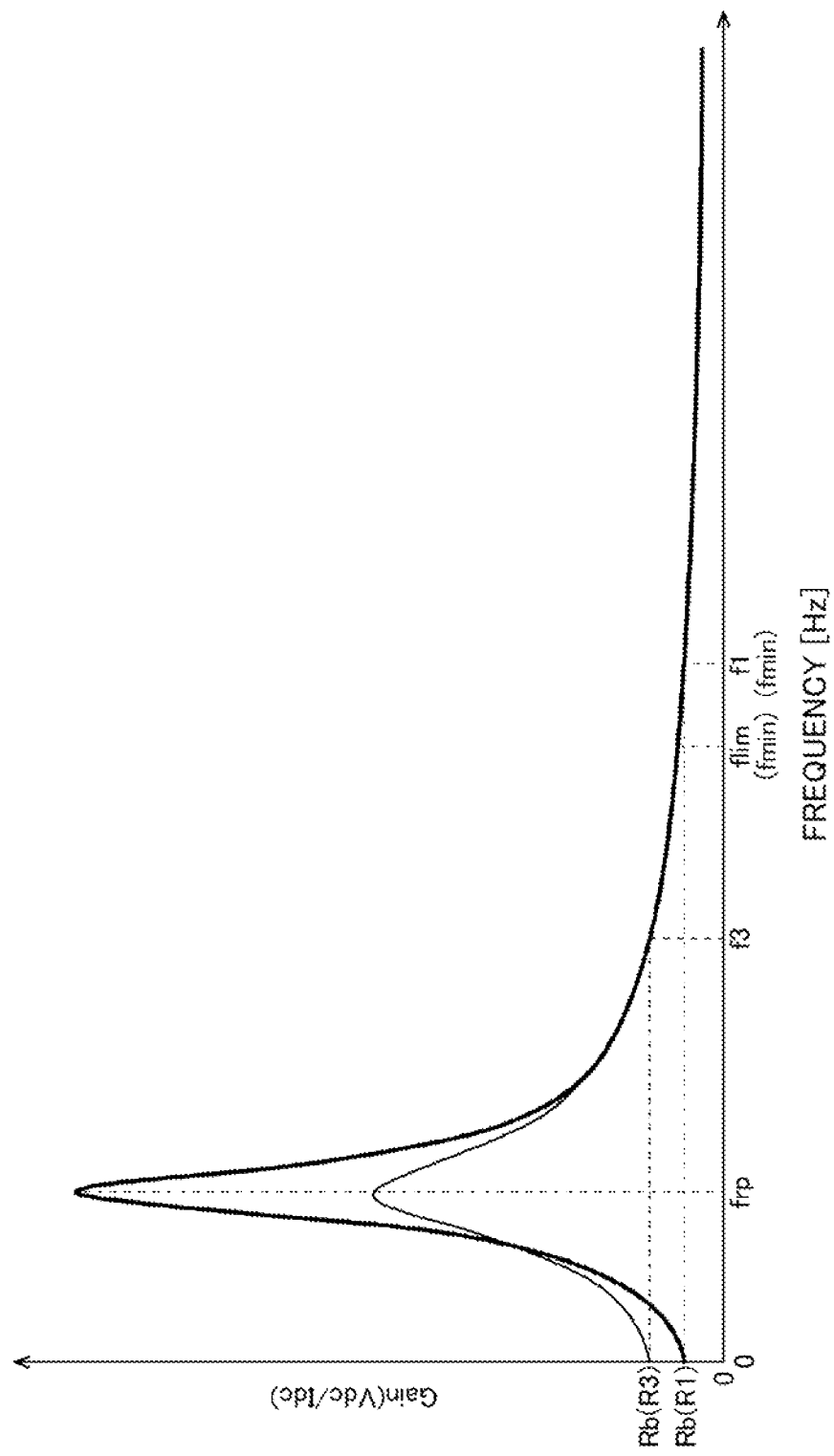
FIG. 8 is a diagram showing the condition for determining the switching frequency by taking operating temperatures into account.

The battery resistance Rb changes with the operating temperature of the battery 11 (operating temperature of the rotary electric machine driving device 100). As a result, the lower limit frequency fmin also changes with the temperature. FIG. 8 shows simulation results of the frequency characteristic of the direct-current side voltage gain at the maximum temperature (such as 60[° C.]) and the minimum temperature (such as −40[° C.]) in an operating temperature range. The thick line in FIG. 8 indicates the frequency characteristic at the maximum temperature, and the thin line indicates the frequency characteristic at the minimum temperature, in the operating temperature range. In the present embodiment, the battery resistance Rb is R1[Ω] at the maximum temperature and R3[Ω] at the minimum temperature, where R1<R2<R3.

As described above, the value of the direct-current side voltage gain at the frequency of "0" is equal to the battery resistance Rb. The battery resistance Rb tends to increase as the operating temperature drops, so that the battery resistance Rb has the largest value at the minimum temperature in the operating temperature range. Accordingly, the switching frequency fc is preferably set based on the frequency characteristic of the direct-current side voltage gain obtained using the value of the battery resistance Rb (power supply internal resistance Rps) at the minimum temperature in the operating temperature range of the rotary electric machine driving device 100. In this case, the lower limit frequency fmin of the switching frequency fc is set to a frequency "f3" obtained based on at least the frequency characteristic at the minimum temperature, so that the switching frequency fc is appropriately set without being set to an excessively high frequency. Obviously, a case is not excluded in which the lower limit frequency fmin of the switching frequency fc is set to a frequency "f1" obtained based on the frequency characteristic at the maximum temperature in view of reliability. Also, a case is not excluded in which the lower limit frequency fmin is set to a frequency "f2" obtained based on the frequency characteristic at normal temperature (such as 20° C. to 25° C.), for example, as shown in FIG. 7.

In addition to the pulsations of the system voltage Vdc and the battery current Ib described above, noise in an audible range is also known as a phenomenon caused by the switching frequency fc. The audible range is a frequency band in which human auditory system can sense sounds, and roughly corresponds to a range from 20 [Hz] to 20 [kHz]. The switching frequency fc, when included in the audible range, produces uncomfortable noise, and may thus impair comfort of occupants of the vehicle. Hence, the switching frequency fc is preferably adjusted not to be included in the audible range. Specifically, the lower limit frequency fmin of the switching frequency fc is preferably set to a frequency that is equal to or higher than a limit frequency flim (such as 20 [kHz]) having a predefined value above the audible range. In the present example, the limit frequency flim is set to 20 [kHz], which is the upper-limit frequency of the audible range. However, the limit frequency flim may be obviously set to a higher frequency (such as 25 [kHz]) in view of reliability.

In this manner, when reduction of the noise in the audible range is taken into account, the lower limit frequency fmin of the switching frequency fc is set according to the magnitude relation of the frequency determined based on the frequency characteristics of the direct-current side voltage gain and the battery current gain with the limit frequency flim. For example, in the case in which the lower limit frequency fmin of the switching frequency fc is set based on the frequency characteristic at normal temperature, the lower limit frequency fmin is set to the limit frequency flim if the frequency "f2" is lower than the limit frequency flim (refer to FIG. 7). For example, in the case in which the lower limit frequency fmin of the switching frequency fc is set based on the frequency characteristic at the minimum temperature in the operating temperature range (refer to FIG. 8), the lower limit frequency fmin is set to the limit frequency flim, in the same manner. For example, in the case in which the lower limit frequency fmin of the switching frequency fc is set based on the frequency characteristic at the maximum temperature in the operating temperature range, the lower limit frequency fmin is set to "f1" if the frequency "f1" is higher than the limit frequency flim.

The system current Idc tends to increase as power (rotary electric machine power) calculated by multiplying the torque by the rotating speed of the rotary electric machine MG increases. In addition, as the rotating speed of the rotary electric machine MG increases, the back electromotive force, a modulation factor, and a sixth-order harmonic component and harmonic components of integer multiple orders thereof of the voltage command value increase. As a result, even if the gains determined corresponding to the switching frequency fc remain unchanged, the pulsations of the system voltage Vdc and the battery current Ib increase as the torque and the rotating speed of the rotary electric machine MG increase. The pulsation amplitude of the system voltage Vdc is the difference between the maximum value and the minimum value in a voltage waveform obtained by superposing, on the fundamental ripple at the ripple frequency 2fc, the harmonic components (in particular, the sixth-order harmonic component and the harmonic components ($6f, 12f, 18f, \ldots$) of integer multiple orders thereof, refer to thick dashed-dotted lines in FIG. 11, etc.) generated corresponding to the rotating speed of the rotary electric machine MG. If the pulsation amplitude of the system voltage Vdc increases to exceed a predefined allowable voltage ripple range Vp (such as 40 [V], refer to FIG. 11, etc.), the IGBTs 3 (switching elements) cannot be sufficiently protected.

Figure 11:
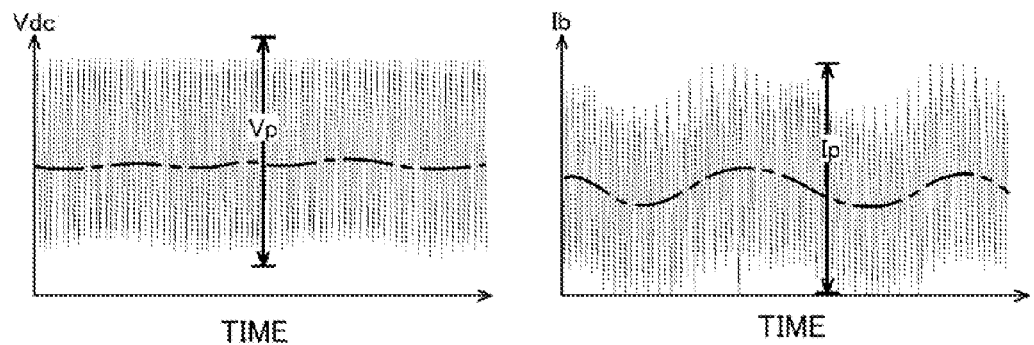
FIG. 11 shows waveform diagrams illustrating pulsations of a system voltage and a battery current.

In the same manner, the pulsation amplitude of the battery current Ib is the difference between the maximum value and the minimum value in a current waveform obtained by superposing, on the fundamental ripple at the ripple frequency 2fc, the harmonic components (in particular, the sixth-order harmonic component and the harmonic components ($6f, 12f, 18f, \ldots$) of integer multiple orders thereof, refer to thick dashed-dotted lines in FIG. 11, etc.) generated corresponding to the rotating speed of the rotary electric machine MG. If the pulsation amplitude of the battery current Ib increases to exceed a predefined allowable current ripple range Ip (such as 60 [A], refer to FIG. 11, etc.), the battery 11 cannot be sufficiently protected.

To solve these problems, the pulsation amplitudes of the system voltage Vdc and the battery current Ib relatively increasing with the increase in the power of the rotary electric machine MG can be compensated by reducing the switching period Tc (in other words, by increasing the switching frequency fc). Specifically, as is clear from, for example, FIG. 7, the gains are reduced by increasing the switching frequency fc in a range of frequencies higher than the resonance frequency frp, so that the pulsations of the system voltage Vdc and the like can be kept low when the system current Idc increases. Accordingly, the switching frequency fc is preferably set to a value varying corresponding to both the torque and the rotating speed that determine the power of the rotary electric machine MG. As an embodiment, the switching frequency fc is preferably set higher as the power of the rotary electric machine MG increases.

Figure 10:
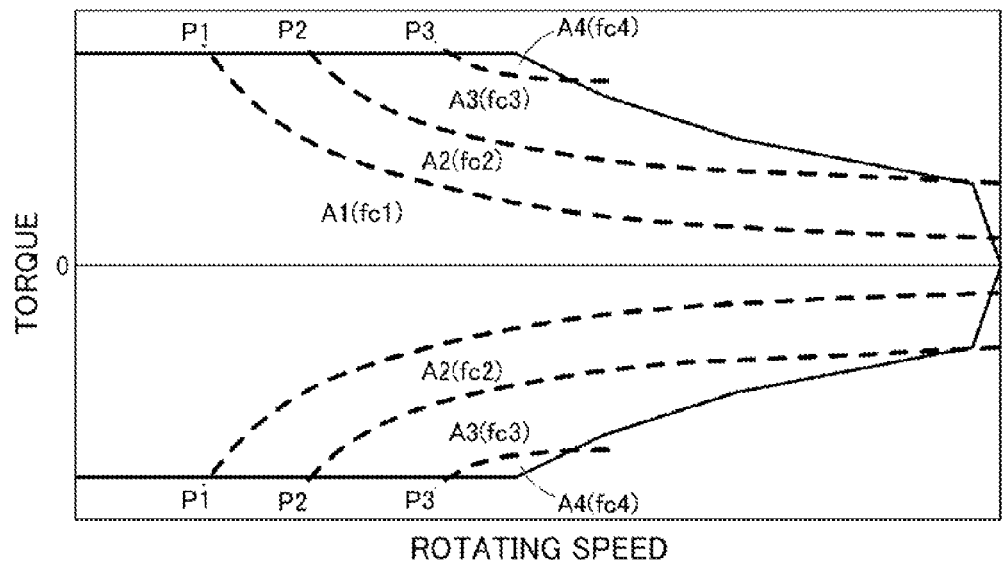
FIG. 10 is a diagram showing a correspondence map of the switching frequency corresponding to power of the rotary electric machine.

FIG. 10 shows an operation map of the rotary electric machine MG. In the operation map, a plurality of operation regions A1 to A4 are set corresponding to the torque and the rotating speed of the rotary electric machine MG. In the present embodiment, each of the operation regions A1 to A4 is a region corresponding to the power calculated by multiplying the torque by the rotating speed of the rotary electric machine MG. The operation region A1 is a region in which the power of the rotary electric machine MG is lower, in absolute value, than a first reference value P1. The operation region A2 is a region in which the power of the rotary electric machine MG is equal to or higher, in absolute value, than the first reference value P1, and is lower, in absolute value, than a second reference value P2 having a predefined value larger than the first reference value P1. The operation region A3 is a region in which the power of the rotary electric machine MG is equal to or higher, in absolute value, than the second reference value P2, and is lower, in absolute value, than a third reference value P3 having a predefined value larger than the second reference value P2. The operation region A4 is a region in which the power of the rotary electric machine MG is equal to or higher, in absolute value, than the third reference value P3.

In the present embodiment, the switching frequency fc is set to a value that is different for each of the operation regions A1 to A4. A frequency fc1 is set for the operation region A1; a frequency fc2 (>fc1) is set for the operation region A2; a frequency fc3 (>fc2) is set for the operation region A3; and a frequency fc4 (>fc3) is set for the operation region A4. In other words, in this example, a constant value of the switching frequency fc is set for each of the operation regions A1 to A4 so that the switching frequency fc changes in a stepwise manner between adjacent operation regions. In this manner, as an embodiment, the switching frequency fc is preferably set to be higher in a stepwise manner as the power of the rotary electric machine MG increases. The frequency fc1 corresponding to the operation region A1 is set to the lower limit frequency fmin of the switching frequency fc or higher, where the lower limit frequency fmin is set based on the direct-current side voltage gain, the battery current gain, and the limit frequency flim as described above. The frequency fc1 is set to an upper limit frequency fmax (to be described later) of the switching frequency fc or lower. The same applies to the frequencies fc2 to fc4.

Figure 12:
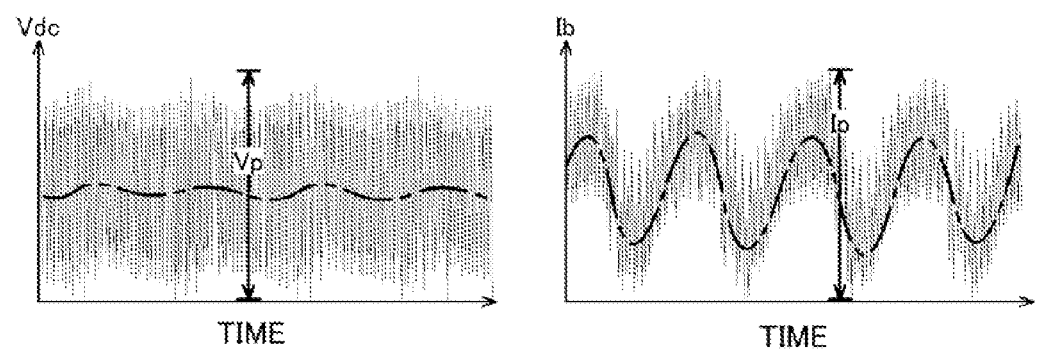
FIG. 12 shows waveform diagrams illustrating the pulsations of the system voltage and the battery current.
Figure 13:
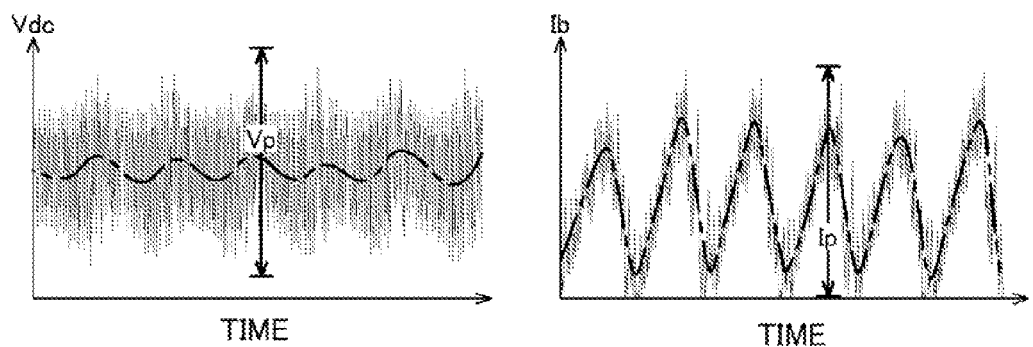
FIG. 13 shows waveform diagrams illustrating the pulsations of the system voltage and the battery current.

FIGS. 11 to 13 show waveforms of the system voltage Vdc and the battery current Ib obtained by performing the simulations by varying the switching frequency fc corresponding to the power of the rotary electric machine MG. Under the condition of constant torque, FIG. 11 shows a case in which the switching frequency is set to 20 [kHz] at the rotating speed of 1000 [rpm]; FIG. 12 shows a case in which the switching frequency is set to 30 [kHz] at the rotating speed of 2000 [rpm]; and FIG. 13 shows a case in which the switching frequency is set to 40 [kHz] at the rotating speed of 3000 rpm. As is clear from these results, increasing the switching frequency fc along with the increase in the power of the rotary electric machine MG can limit the pulsation amplitudes of the system voltage Vdc and the battery current Ib within the allowable ranges Vp and Ip defined for Vdc and Tb, respectively.

The upper limit frequency fmax of the switching frequency fc is also preferably set. As the switching frequency fc increases, the number of switching per unit time increases, so that the switching loss in the inverter 10 also increases. Hence, it is preferable to define conditions for the upper limit frequency fmax, in addition to those for the lower limit frequency fmin. As an embodiment, the upper limit frequency fmax of the switching frequency fc is preferably set to a frequency at which the switching loss of the inverter 10 falls at or below a predefined upper limit loss.

Considering vehicles equipped with the rotary electric machine driving device 100, the supplier of the battery 11, the supplier of the IGBT 3 of the inverter 10, and the supplier of the control device 8 may differ from vehicle to vehicle. Specifically, the control device 8 can preferably set an appropriate value of the switching frequency fc when the battery resistance Rb, the battery inductance Lb, the withstand voltage of the IGBT 3, and the like vary depending on the vehicle. As described above, according to the present disclosure, the switching frequency fc can be set based on the torque and the rotating speed of the rotary electric machine MG, and the technique of the present disclosure can be widely applied.

To summarize the above description, in a conceptual sense, the switching frequency fc is preferably set so as to satisfy the following criteria. Specifically, the switching frequency fc is preferably set so as to satisfy all the following:

(a) the pulsation of the system voltage Vdc generated corresponding to the switching frequency fc shall fall within a range in which the IGBTs 3 (switching elements) of the inverter 10 can be protected;

(b) the pulsation of the battery current Ib generated corresponding to the switching frequency fc shall fall within a range in which the battery 11 can be protected;

(c) no noise shall be produced in the audible range; and (d) the switching loss of the inverter 10 corresponding to the switching frequency fc shall not be excessively large.

More specifically, the lower limit frequency fmin of the switching frequency fc is preferably set so as to satisfy all the following:

(a') the pulsation amplitude of the system voltage Vdc generated corresponding to the switching frequency fc shall fall within the allowable range (allowable voltage ripple range Vp) predefined based on the withstand voltage of the IGBTs 3 (switching elements) in the inverter 10;

(b') the pulsation amplitude of the battery current Ib generated corresponding to the switching frequency fc shall fall within the allowable range (allowable current ripple range Ip) predefined so as to be capable of reducing the deterioration of the battery 11; and (c') the lower limit frequency fmin shall be equal to or higher than the limit frequency flim having a predefined value above the audible range.

The upper limit frequency fmax of the switching frequency fc is preferably set so as to satisfy the following:

(d') the switching loss of the inverter 10 corresponding to the switching frequency fc shall fall at or below the predefined upper limit loss.

For practical purposes, it is preferable to prepare a map representing a relation between the power of the rotary electric machine MG and the switching frequency fc set in the range from the lower limit frequency fmin to the upper limit frequency fmax which satisfies all of (a') to (d') described above (refer to FIG. 10). In this case, (c') and (d') can be quantitatively defined to some extent. Hence, it is preferable to obtain in advance the switching frequency fc that satisfies, in addition to (c') and (d'), (a') and (b') corresponding to the power of the rotary electric machine MG. The switching frequency fc thus set starts from a predetermined frequency equal to or higher than the limit frequency flim, and increases in a stepwise manner with the increase in the power of the rotary electric machine MG.

The switching frequency fc needs to be set higher to satisfy (a') to (c') while using the low-capacity smoothing capacitor 40, so that the rotary electric machine MG is difficult to be controlled in a rotation synchronization control mode. For this reason, the present embodiment does not include the rotation synchronization control mode among selectable control modes. The rotation synchronization control mode is a control mode (such as a one-pulse control mode or a five-pulse control mode) in which the predefined number of pulses are output in synchronization with the rotation of the rotary electric machine MG. As shown in FIG. 9, an operation point region on the high rotating speed side of an operation point region corresponding to the normal two-phase modulation mode (DPWM) is not set to a pulse-modulated mode, but is set to the two-phase modulation mode with the field-weakening control (DPWM+AFR).

The present disclosure can be widely applied to rotary electric machine driving devices that are designed based on the concept described above. Those skilled in the art will be able to easily understand that appropriate modifications can be made based on the specific embodiment described above within the scope not departing from the object of the present disclosure. Accordingly, the present disclosure also obviously includes other embodiments modified within the scope not departing from the object of the present disclosure.

For example, as an embodiment, the switching frequency fc may be set to be variable with a modulation factor M, instead of the power of the rotary electric machine MG described above (refer to FIG. 14). Specifically, the switching frequency fc may be set to start from a predetermined frequency equal to or higher than the limit frequency flim, and increase in a stepwise manner (fc1'<fc2'<fc3'<fc4') as the modulation factor M increases. The modulation factor M is an indicator representing a ratio of an effective value of the alternating-current voltage command value to the system voltage Vdc, and is calculated by formula (7) using two-axis voltage command values Vd and Vq in the vector control method.

[Formula 7]

$$M = \frac{\sqrt{Vd^2 + Vq^2}}{Vdc} \qquad (7)$$

Figure 14:
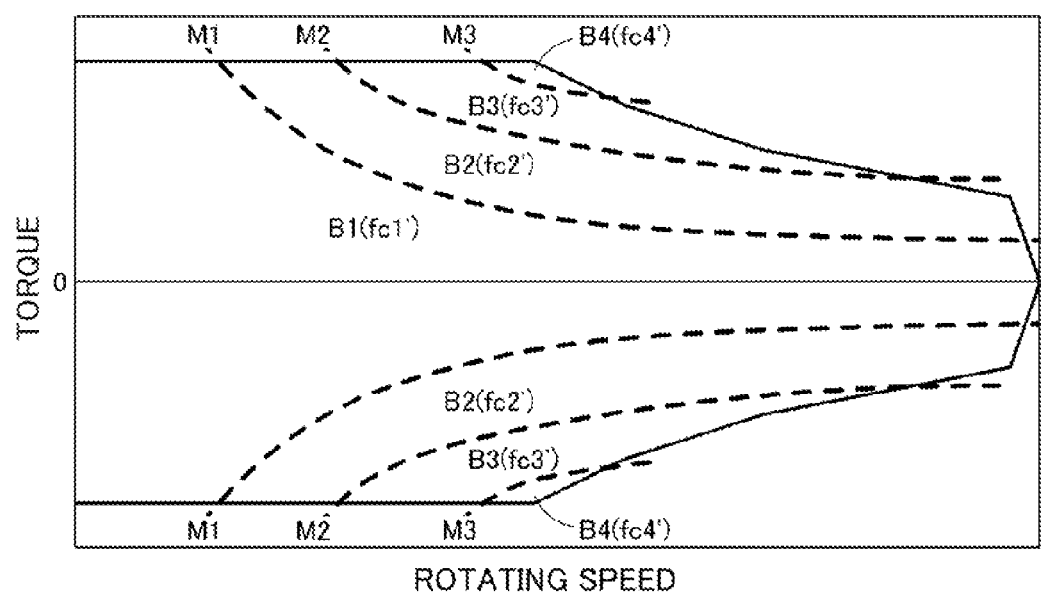
FIG. 14 is a diagram showing a correspondence map of the switching frequency corresponding to a modulation factor.

As an embodiment, as shown, for example, in FIG. 14, a plurality of reference values M1 to M3 (M1<M2<M3) can be used to prepare a map for operation regions B1 to B4 according to the modulation factor M so as to correspond to the torque and the rotating speed of the rotary electric machine MG. Also in the case of setting the switching frequency fc according to the modulation factor M, satisfaction of (a') to (d') described above is preferably taken into account.

As an embodiment, in the case of setting the switching frequency fc to be variable with the power of the rotary electric machine MG or the modulation factor M, the switching frequency fc may be varied not in a stepwise manner, but in a continuous manner. Specifically, the switching frequency fc may be set to start from a predetermined frequency equal to or higher than the limit frequency flim, and continuously increase as the power of the rotary electric machine MG or the modulation factor M increases.

As an embodiment, the lower limit frequency fmin of the switching frequency fc may be set by considering that only (a') and (b') are satisfied, without considering (c'). In this case, the control device 8 sets the switching frequency fc to a value varying corresponding to both the torque and the rotating speed of the rotary electric machine MG, according to the pulsation amplitude of the system voltage Vdc and the pulsation amplitude of the battery current Ib. In more detail, the control device 8 sets the switching frequency fc to a value varying corresponding to both the torque and the rotating speed of the rotary electric machine MG so that each of the pulsation amplitude of the system voltage Vdc and the pulsation amplitude of the battery current Ib falls within the predefined allowable range thereof. In this case, although the noise in the audible range may be produced in some cases, at least the IGBTs 3 (switching elements) of the inverter 10 and the battery 11 can be protected.

Only one of (a') and (b') may be taken into account, regardless of whether (c') is taken into account. Specifically, if (a') is taken into account, the control device 8 sets the switching frequency fc to a value varying corresponding to both the torque and the rotating speed of the rotary electric machine MG, according to the pulsation amplitude of the system voltage Vdc. In more detail, the control device 8 sets the switching frequency fc to a value varying corresponding to both the torque and the rotating speed of the rotary electric machine MG so that the pulsation amplitude of the system voltage Vdc falls within the predefined allowable range thereof. In this case, at least the IGBTs 3 (switching elements) of the inverter 10 can be protected. If (b') is taken into account, the control device 8 sets the switching frequency fc to a value varying corresponding to both the torque and the rotating speed of the rotary electric machine MG, according to the pulsation amplitude of the battery current Ib. In more detail, the control device 8 sets the switching frequency fc to a value varying corresponding to both the torque and the rotating speed of the rotary electric machine MG so that the pulsation amplitude of the battery current Ib falls within the predefined allowable range thereof. In this case, at least the battery 11 can be protected.

In the embodiment described above, as an example, the IGBTs 3 are used as the switching elements, but the configuration of the present disclosure is also highly suitable for a case in which the SiC devices, such as the SiC-MOSFETs or the SiC-SITs, are used as the switching elements. That is, the SiC devices have characteristics of a smaller switching loss, which is more stably operable at high temperatures than the Si devices, and are thus characterized by being stably operable with a reduced loss even when the switching frequency is relatively high. For this reason, the configuration of the present disclosure is preferable, in particular, when such SiC devices are used as the switching elements, and a wide range of frequencies is used as the switching frequency.

INDUSTRIAL APPLICABILITY

The present disclosure can be applied to a rotary electric machine driving device that drives and controls an alternating-current rotary electric machine.

The invention claimed is:

1. A rotary electric machine driving device that drives and controls an alternating-current rotary electric machine, the rotary electric machine driving device comprising:
an inverter that is electrically interposed between a direct-current power supply and the rotary electric machine, and converts electric power between a direct current and an alternating current;
a smoothing capacitor that is electrically interposed between the direct-current power supply and the inverter, and is connected between a positive pole and a negative pole on a direct-current side of the inverter; and
an inverter control unit that controls switching of a switching element of the inverter according to a predefined switching frequency, wherein
the inverter control unit sets the switching frequency to a value varying corresponding to both torque and a rotating speed of the rotary electric machine, according to pulsation amplitude of a system voltage that is a voltage on the direct-current side of the inverter and pulsation amplitude of a power supply current that is a current flowing through the direct-current power supply, and
the inverter control unit sets the switching frequency higher as rotary electric machine power or a modulation factor increases, the rotary electric machine power being calculated by multiplying the torque by the rotating speed of the rotary electric machine, the modulation factor representing a ratio of an effective value of an alternating-current voltage command value to a system voltage that is a voltage on the direct-current side of the inverter.

2. The rotary electric machine driving device according to claim 1, wherein
the inverter control unit sets the switching frequency to a value varying corresponding to both the torque and the rotating speed of the rotary electric machine so that each of the pulsation amplitude of the system voltage that is the voltage on the direct-current side of the inverter and the pulsation amplitude of the power supply current that is the current flowing through the direct-current power supply falls within a predefined allowable range.

3. The rotary electric machine driving device according to claim 1, wherein
the inverter control unit sets the switching frequency so as to be equal to or higher than a limit frequency having a predefined value above an audible range, and so as to be higher than a frequency at which the value of a direct-current side voltage gain is maximum in a frequency wherein the direct-current side voltage gain obtained by dividing the system voltage that is the voltage on the direct-current side of the inverter by a system current that is a current on the direct-current side of the inverter.

4. The rotary electric machine driving device according to claim 3, wherein
the inverter control unit sets the switching frequency so as to be equal to or higher than the limit frequency, and so as to be equal to or higher than the frequency at which, in the frequency wherein the direct-current side voltage gain, the value of the direct-current side voltage gain is equal to a value thereof at the frequency of zero.

5. The rotary electric machine driving device according to claim 1, wherein
a plurality of operation regions are set corresponding to power calculated by multiplying the torque by the rotating speed of the rotary electric machine, and
the inverter control unit sets the switching frequency to a value that is different for each of the operation regions.

6. A rotary electric machine driving device that drives and controls an alternating-current rotary electric machine, the rotary electric machine driving device comprising:
an inverter that is electrically interposed between a direct-current power supply and the rotary electric machine, and converts electric power between a direct current and an alternating current;
a smoothing capacitor that is electrically interposed between the direct-current power supply and the inverter, and is connected between a positive pole and a negative pole on a direct-current side of the inverter; and
an inverter control unit that controls switching of a switching element of the inverter according to a pre-defined switching frequency, wherein
the inverter control unit sets the switching frequency to a value varying corresponding to both torque and a rotating speed of the rotary electric machine, according to pulsation amplitude of a system voltage that is a voltage on the direct-current side of the inverter, and
the inverter control unit sets the switching frequency higher as rotary electric machine power or a modulation factor increases, the rotary electric machine power being calculated by multiplying the torque by the rotating speed of the rotary electric machine, the modulation factor representing a ratio of an effective value of an alternating-current voltage command value to a system voltage that is a voltage on the direct-current side of the inverter.

7. The rotary electric machine driving device according to claim 6, wherein
the inverter control unit sets the switching frequency to a value varying corresponding to both the torque and the rotating speed of the rotary electric machine so that the pulsation amplitude of the system voltage that is the voltage on the direct-current side of the inverter falls within a predefined allowable range.

8. The rotary electric machine driving device according to claim 6, wherein
the inverter control unit sets the switching frequency so as to be equal to or higher than a limit frequency having a predefined value above an audible range, and so as to be higher than a frequency at which the value of a direct-current side voltage gain is maximum in a frequency wherein the direct-current side voltage gain obtained by dividing the system voltage that is the voltage on the direct-current side of the inverter by a system current that is a current on the direct-current side of the inverter.

9. The rotary electric machine driving device according to claim 8, wherein
the inverter control unit sets the switching frequency so as to be equal to or higher than the limit frequency, and so as to be equal to or higher than the frequency at which, in the frequency wherein the direct-current side voltage gain, the value of the direct-current side voltage gain is equal to a value thereof at the frequency of zero.

10. The rotary electric machine driving device according to claim 6, wherein
a plurality of operation regions are set corresponding to power calculated by multiplying the torque by the rotating speed of the rotary electric machine, and
the inverter control unit sets the switching frequency to a value that is different for each of the operation regions.

11. A rotary electric machine driving device that drives and controls an alternating-current rotary electric machine, the rotary electric machine driving device comprising:
an inverter that is electrically interposed between a direct-current power supply and the rotary electric machine, and converts electric power between a direct current and an alternating current;
a smoothing capacitor that is electrically interposed between the direct-current power supply and the inverter, and is connected between a positive pole and a negative pole on a direct-current side of the inverter; and
an inverter control unit that controls switching of a switching element of the inverter according to a pre-defined switching frequency, wherein
the inverter control unit sets the switching frequency to a value varying corresponding to both torque and a rotating speed of the rotary electric machine, according to pulsation amplitude of a power supply current that is a current flowing through the direct-current power supply, and
the inverter control unit sets the switching frequency higher as rotary electric machine power or a modulation factor increases, the rotary electric machine power being calculated by multiplying the torque by the rotating speed of the rotary electric machine, the modulation factor representing a ratio of an effective value of an alternating-current voltage command value to a system voltage that is a voltage on the direct-current side of the inverter.

12. The rotary electric machine driving device according to claim 11, wherein
the inverter control unit sets the switching frequency to a value varying corresponding to both the torque and the rotating speed of the rotary electric machine so that the pulsation amplitude of the power supply current that is the current flowing through the direct-current power supply falls within a predefined allowable range.

13. The rotary electric machine driving device according to claim 11, wherein
the inverter control unit sets the switching frequency so as to be equal to or higher than a limit frequency having a predefined value above an audible range, and so as to be higher than a frequency at which the value of a direct-current side voltage gain is maximum in a frequency wherein the direct-current side voltage gain obtained by dividing the system voltage that is the voltage on the direct-current side of the inverter by a system current that is a current on the direct-current side of the inverter.

14. The rotary electric machine driving device according to claim 13, wherein
the inverter control unit sets the switching frequency so as to be equal to or higher than the limit frequency, and so as to be equal to or higher than the frequency at which, in the frequency wherein the direct-current side voltage gain, the value of the direct-current side voltage gain is equal to a value thereof at the frequency of zero.

15. The rotary electric machine driving device according to claim 11, wherein a plurality of operation regions are set corresponding to power calculated by multiplying the torque by the rotating speed of the rotary electric machine, and the inverter control unit sets the switching frequency to a value that is different for each of the operation regions.

* * * * *